(12) United States Patent
Lassiter

(10) Patent No.: US 6,523,231 B1
(45) Date of Patent: Feb. 25, 2003

(54) POWER CORD CLIP

(75) Inventor: Jerry E. Lassiter, 6939 Schoepf Dr., Northfield, OH (US) 44067

(73) Assignee: Jerry E. Lassiter, Northfield, OH (US)

(*) Notice: Subject to any disclaimer, the term of this patent is extended or adjusted under 35 U.S.C. 154(b) by 0 days.

(21) Appl. No.: 09/720,773
(22) PCT Filed: Jul. 1, 1999
(86) PCT No.: PCT/US99/14959
§ 371 (c)(1), (2), (4) Date: Feb. 23, 2001
(87) PCT Pub. No.: WO00/01971
PCT Pub. Date: Jan. 13, 2000

Related U.S. Application Data

(63) Continuation-in-part of application No. 09/110,050, filed on Jul. 2, 1998, now Pat. No. 6,158,095.

(51) Int. Cl.[7] .............................. A44B 21/00; F16L 3/02
(52) U.S. Cl. ............... 24/339; 248/229.16; 248/229.26; 248/74.2; 403/396; 24/129 R
(58) Field of Search .......................... 24/338, 339, 501, 24/502, 511, 129 R, 115 A, 132 R, 133, 127, 122.6, 115 R; 403/396, 398, 391, 389; 248/229.16, 229.26, 68.1, 74.2, 74.3

(56) References Cited

U.S. PATENT DOCUMENTS

| | | | |
|---|---|---|---|
| 1,216,531 A | | 2/1917 | Wolf |
| 1,816,301 A | | 7/1931 | Sundell |
| 2,452,406 A | | 10/1948 | Volkery et al. |
| 2,644,210 A | * | 7/1953 | McNamee .................. 24/532 |
| 2,696,963 A | | 12/1954 | Shepherd |
| 2,723,431 A | | 11/1955 | Di Renzo |
| 3,090,826 A | | 5/1963 | Cochran |
| 3,096,551 A | | 7/1963 | Shoberg |
| 3,521,332 A | | 7/1970 | Kramer |
| 3,848,839 A | | 11/1974 | Tillman |
| 4,662,039 A | * | 5/1987 | Richardson ................. 24/489 |
| 4,707,906 A | | 11/1987 | Posey |
| 4,966,344 A | * | 10/1990 | Gary ......................... 248/317 |
| 5,075,935 A | * | 12/1991 | Abdi ......................... 24/511 |
| 5,309,604 A | | 5/1994 | Poulsen |
| 5,388,802 A | | 2/1995 | Dougan et al. |
| 5,441,224 A | | 8/1995 | Ludwig |
| 5,542,209 A | | 8/1996 | Sheu |
| 5,632,552 A | | 5/1997 | Wang et al. |
| 5,769,556 A | | 6/1998 | Colley |
| 5,784,762 A | | 7/1998 | Huntting |
| 5,941,487 A | * | 8/1999 | Keely ..................... 248/231.51 |
| 6,023,818 A | * | 2/2000 | Shang ........................ 24/501 |
| 6,105,218 A | * | 8/2000 | Reekie ....................... 24/518 |
| 6,158,095 A | | 12/2000 | Lassiter |

* cited by examiner

Primary Examiner—Robert J. Sandy
(74) Attorney, Agent, or Firm—Alexander D. Bommarito, Esq; Hahn Loeser & Parks, LLP

(57) ABSTRACT

A clip for retaining a power or extension cords for transport and to prevent damage to the cord. The clip has two sleeves (32, 34) that are created when an upper (12) and lower (14) member are coupled together by a spring clip (18). One sleeve (34) is closed and the other sleeve (32) has an opening for insertion of a power cord. A lever (16) is formed in the upper member (12) to allow for opening of the open end of the clip for the insertion of a cord. Within the closed sleeve (34) is a retaining mechanism that aids in the retention and positioning of a power cord. Integrally molded with the open sleeve (32) may be ribs (42, 44) that increase the frictional engagement between the clip and the cord. The clip can be constructed in one or two pieces and can be used with a variety of different tools and applications.

17 Claims, 4 Drawing Sheets

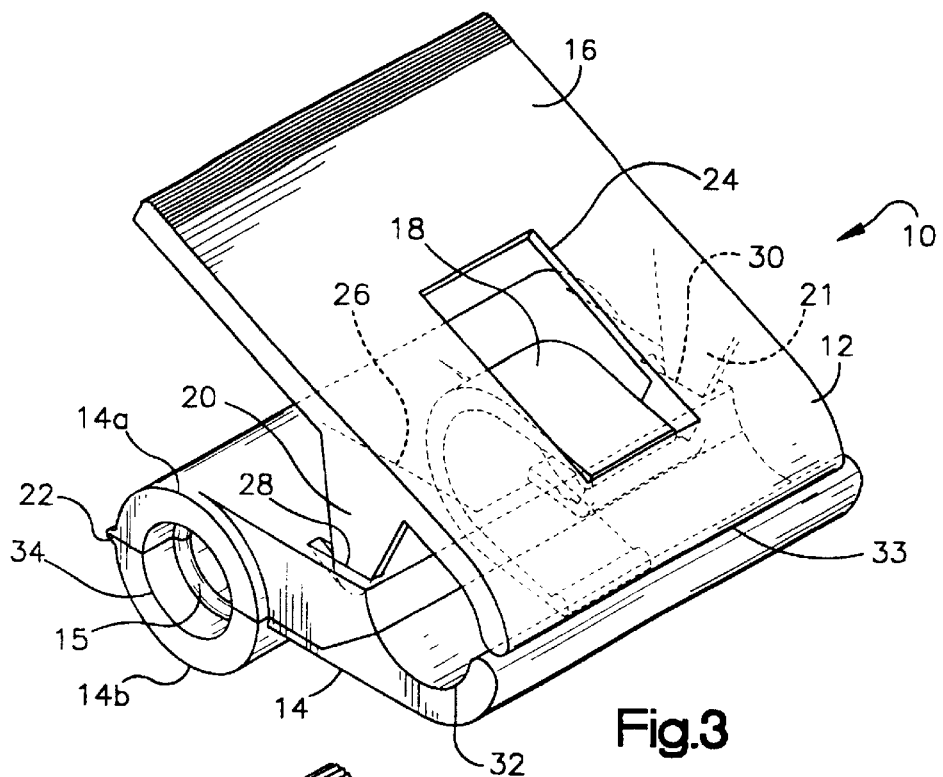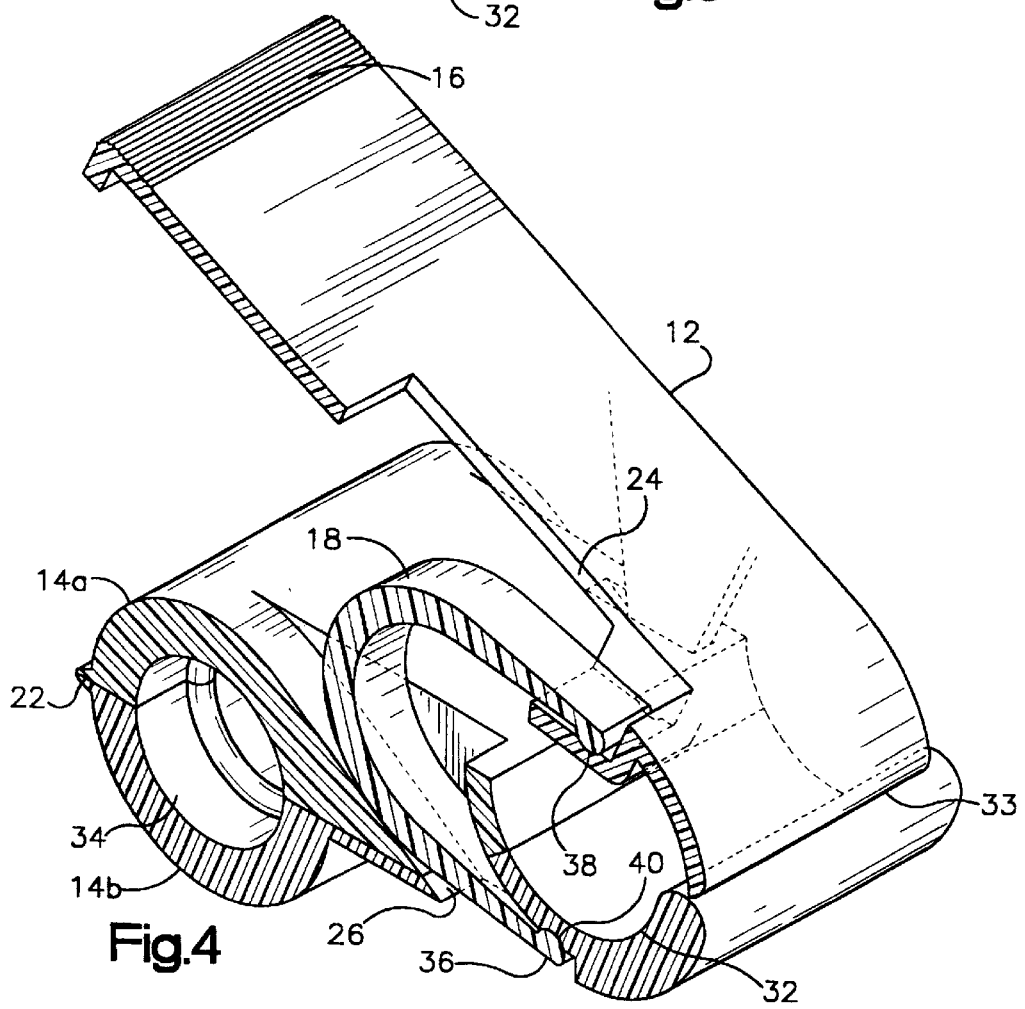

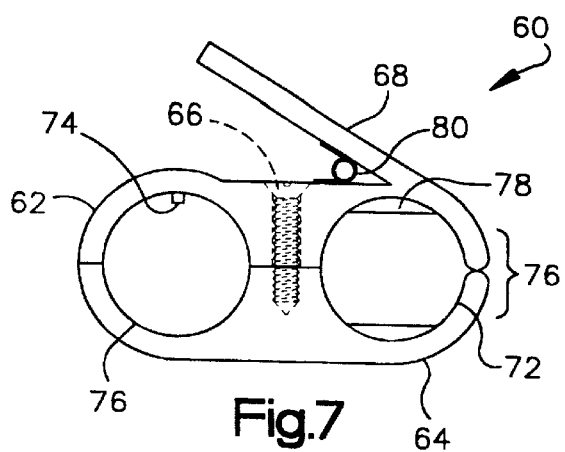
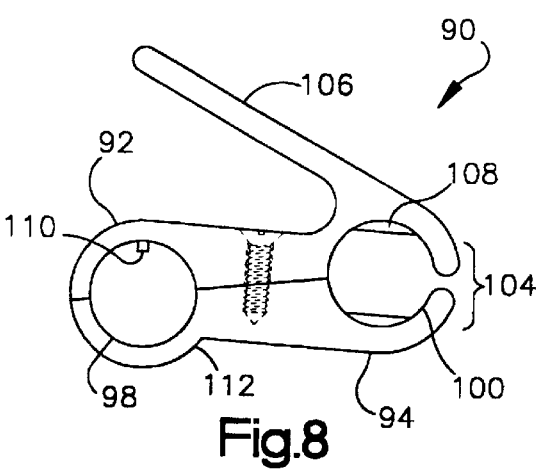
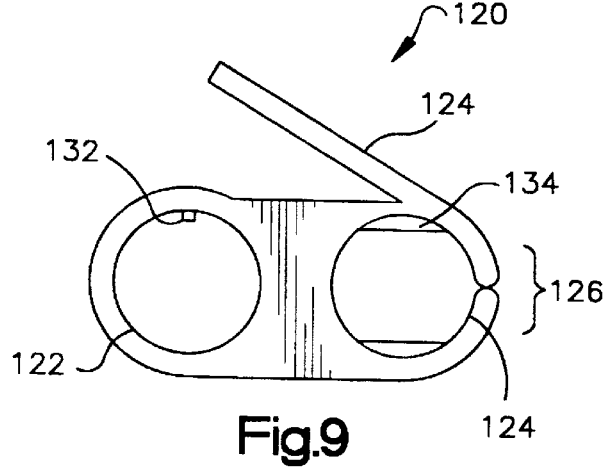
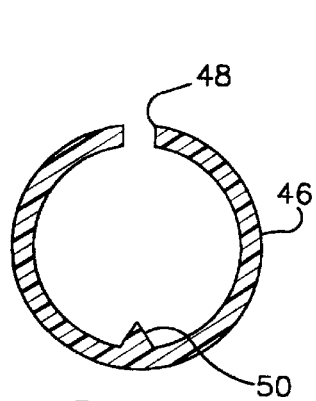
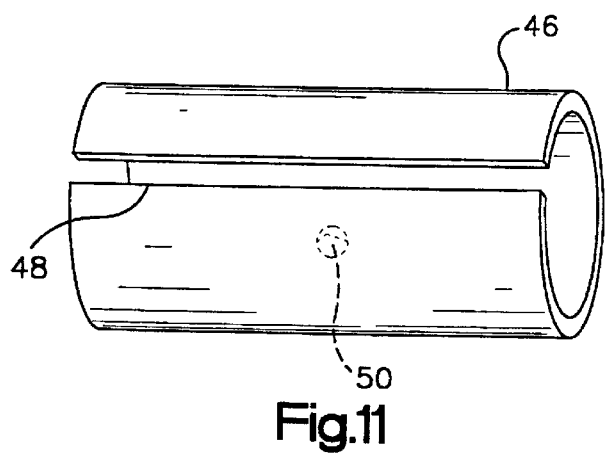

POWER CORD CLIP

CROSS REFERENCE TO A RELATED APPLICATION

This application is a continuation-in-part of application Ser. No. 09/110,050 filed Jul. 2, 1998 now U.S. Pat. No. 6,158,095.

FIELD OF THE INVENTION

The invention relates generally to a device for retaining an electric power cord in a desired position and particularly to a flexible clip that clamps onto the power cord to hold it in place.

BACKGROUND OF THE INVENTION

Electric power cords and extension cords have many uses in peoples everyday life from plugging in a string of lights at Christmas time to using heavy duty power equipment on construction projects. When one is done using power equipment it is often desirous to wrap the power cord around the tool for transport. In doing this, connecting the end of the power cord to another place on the cord for retention is necessary. However, most cords are not equipped with a mechanism for connecting the plug end to another place on the cord. Thus, the cord is pulled into a knot in order to retain the end of the cord. This is detrimental to the life of both the cord itself and the connection between the cord and the attached plug. Further, when connecting two extension cords together, the two cords are often tied together to prevent the connection between the two cords from coming apart and cutting the electricity to the tool. Several devices have been developed in order to assist with this problem, however prior art devices do not accomplish all the desired functions and flexibility to secure the ends of power and extension cords.

SUMMARY OF THE INVENTION

The present invention is a clamp consisting of an upper and lower member, with a lever integrally associated with the upper member which are coupled together by a spring clip that allows for biasing of the upper member away from the lower member when force is applied to the lever. Alternatively, the upper member may have the lever associated integrally with it, having a "living" hinge formed where the lever meets the upper member. The upper member and the lower member may also be attached by means of fasteners, such as screws or molded in a one piece arrangement. The power cord clip has two sleeves, one open and one closed. The closed sleeve is formed within the lower member which can be made of one piece or two piece construction and fastened together by appropriate retaining means. The open sleeve is formed upon securing the members together with the spring clip. The open sleeve has an opening opposite the closed sleeve and relative to the lever to allow the opening to be widened upon actuation of the lever so that a power or extension cord can be placed within the open end of the clip. Within the closed sleeve of the clip there may be a retaining member that keeps the power or extension cord in place when it is being retained by the clip. The retaining member seats into the covering and insulation of the cord in a manner that the cord is retained in the cord clip without damaging the cord while it is being retained. The open sleeve of the clip may have a retention rib on the upper and lower members. These ribs serve to add to the frictional engagement of the cord clip on the cord. In order to hold a power or extension cord, the closed sleeve is positioned around a portion of the cord. This is done by uncoupling the lower member and placing the cord within the closed sleeve, or by placing the cord within the closed sleeve prior to cord being connected to the tool or having plugs connected at the ends of the cord. The open sleeve is then biased to a cord receiving position, and a portion of the cord, or the other end of the cord is then placed into the open sleeve of the clip through the opening or slit in the open sleeve and is retained therein. If the diameter of the cord is too small to be retained by the cord, an insert can be placed on the cord to allow the cord clip to grasp the cord.

It is therefore an object of the present invention to provide a power cord clip that can be used with power cords and extension cords to retain them in position and prevent damage to the cord.

This and other objects and advantages of the invention, as well as the details of illustrative embodiments will be more fully understood from the following specification and drawings.

BRIEF DESCRIPTION OF THE DRAWINGS

FIG. 3 is a side transparent view of the preferred embodiment of the present invention.

FIG. 4 is cross sectional view of the preferred embodiment of the present invention.

FIG. 7 is a side view of a third preferred embodiment of the present invention.

FIG. 8 is a side view of a forth preferred embodiment of the present invention.

FIG. 9 is a side view of a fifth preferred embodiment of the present invention.

FIG. 10 is cross sectional view of the secondary sleeve of the present invention.

FIG. 11 is a side view of the secondary sleeve of the present invention.

DETAILED DESCRIPTION OF THE PREFERRED EMBODIMENT

Reference will now be made in detail to the present preferred embodiments of the present invention, examples of which are illustrated in the accompanying drawings. Whenever possible, the same reference numbers will be used throughout the drawings to refer to the same or like parts.

Figure 1:
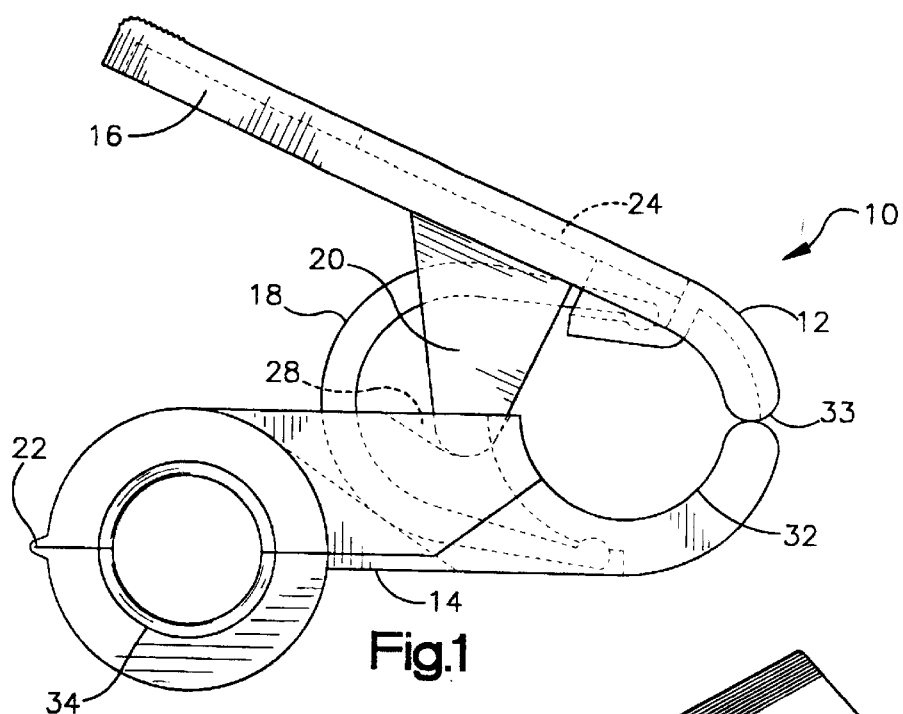
FIG. 1 is a side view of the preferred embodiment of the present invention.
Figure 2:
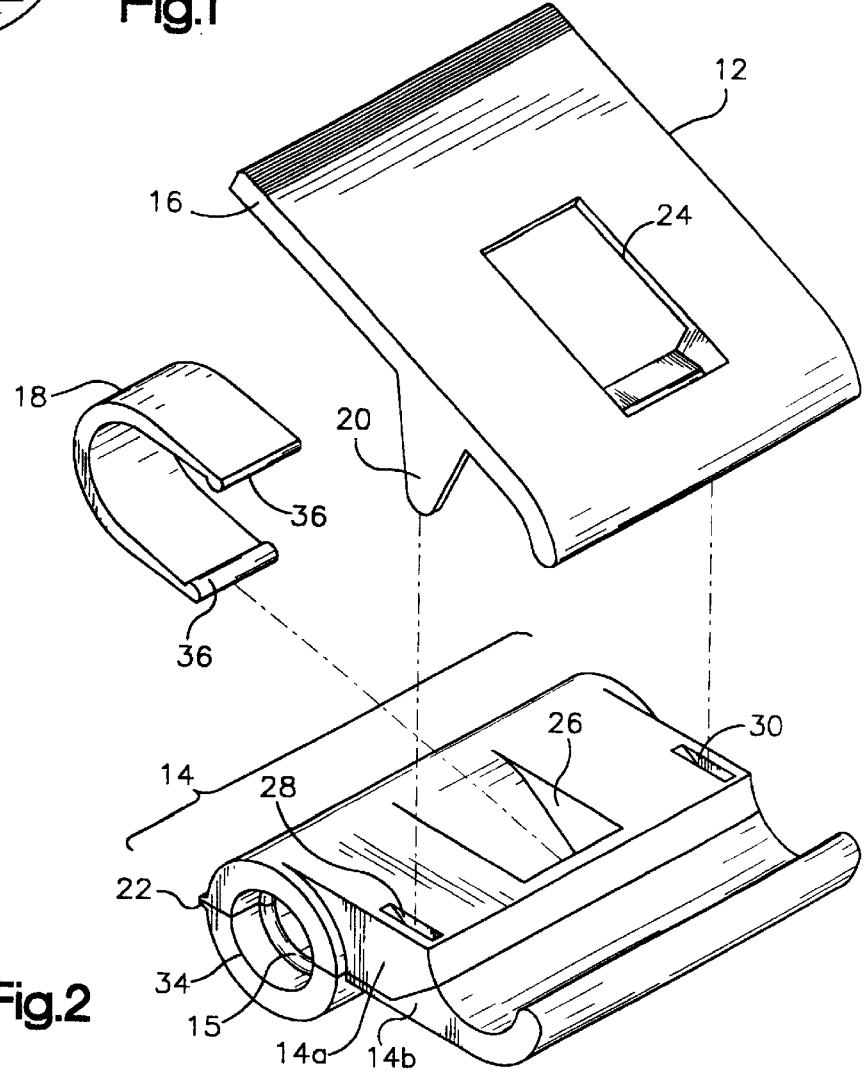
FIG. 2 is an exploded perspective view of the preferred embodiment of the present invention.

Referring now to FIGS. 1 and 2, the power cord clip of the present invention is constructed from two pieces, an upper member 12 and a lower member 14. Upper member 12 consists of an actuating lever 16, two pivot members 20, 21 and a slot 24 that accepts spring clip 18 which couples upper member 12 with lower member 14. Opposite the actuating lever 16 of upper member 12, the upper member 12 is curved in order to create the upper portion of the open sleeve 32 when upper member 12 and lower member 14 are coupled together.

Within the lower member is a closed sleeve 34 within which a power or extension cord is placed. In the preferred embodiment, the lower member 14 consists of two pieces 14a and 14b which are hinged together by hinge 22 and fastened together by attachment means (not shown). The attachment means utilized in the preferred embodiment are male and female snap connectors, however, other sufficient attachment means such as screws may also used to connect the two piece lower member 14 together. When the two pieces of lower member 14 are fastened together, closed sleeve 34 is formed. Optionally, lower member 14 is molded as one piece. Opposite of closed sleeve 34, lower member 14 has a curved portion which forms the lower portion of open sleeve 32. Lower member 14 further has a slot 26 for accepting spring clip 18 which will be further described below. Lower member also contains grooves 28 and 30 which accept pivot members 20, 21 of upper member 12.

Spring clip 18 couples upper member 12 and lower member 14 by sliding into upper member slot 24 and lower member slot 26. Spring clip 18 is u-shaped and has tabs 36 at each end. Upper member slot 24 and lower member slot 26 each have an indentation 38, 40 respectively, at the end each slot near the open sleeve 32 that accept and retain spring clip tabs 36 within each of the slots.

To connect the upper member 12, the lower member 14 and the spring clip 18, pivot members 20 and 21 are inserted into grooves 28 and 30 respectively. The pivot members 20 and 21 may also be secured in a position within grooves 28 and 30 by a suitable mechanism if desired. Spring clip 18 is then slid into upper member slot 24 and lower member slot 26 from the back side of the cord clip 10 relative to the closed sleeve 34. When spring clip 18 is fully inserted into upper member slot 24 and lower member slot 26, spring clip 18 is retained within these slots 24 and 26 by indentations 38 and 40 as can best be seen in FIG. 4.

As can seen best in FIG. 2, integrally molded within the open sleeve 32 and closed sleeve 34 are ribs 15 that aid in securing the section of extension or power cord placed within open sleeve 32 or closed sleeve 34 while the power cord clip is in use. Alternatively, one or more teeth can be integrally molded within the open sleeve 32 and/or closed sleeve 34 to retain the extension or power cord within each respective sleeve while the cord clip is in use. Optionally, a secondary sleeve 46 can be used to secure cords with smaller diameters within the closed sleeve 34 and/or open sleeve 32 of the cord clip of the present invention. As can be seen in FIGS. 10 and 11, secondary sleeve 46 is tubular with an opening 48 within its circumference to allow for insertion of a power or extension cord. Optionally, a retaining tooth 50 can be integrally molded within the secondary sleeve 46 to retain the secondary sleeve 46 on the covering of the power cord.

Figure 5:
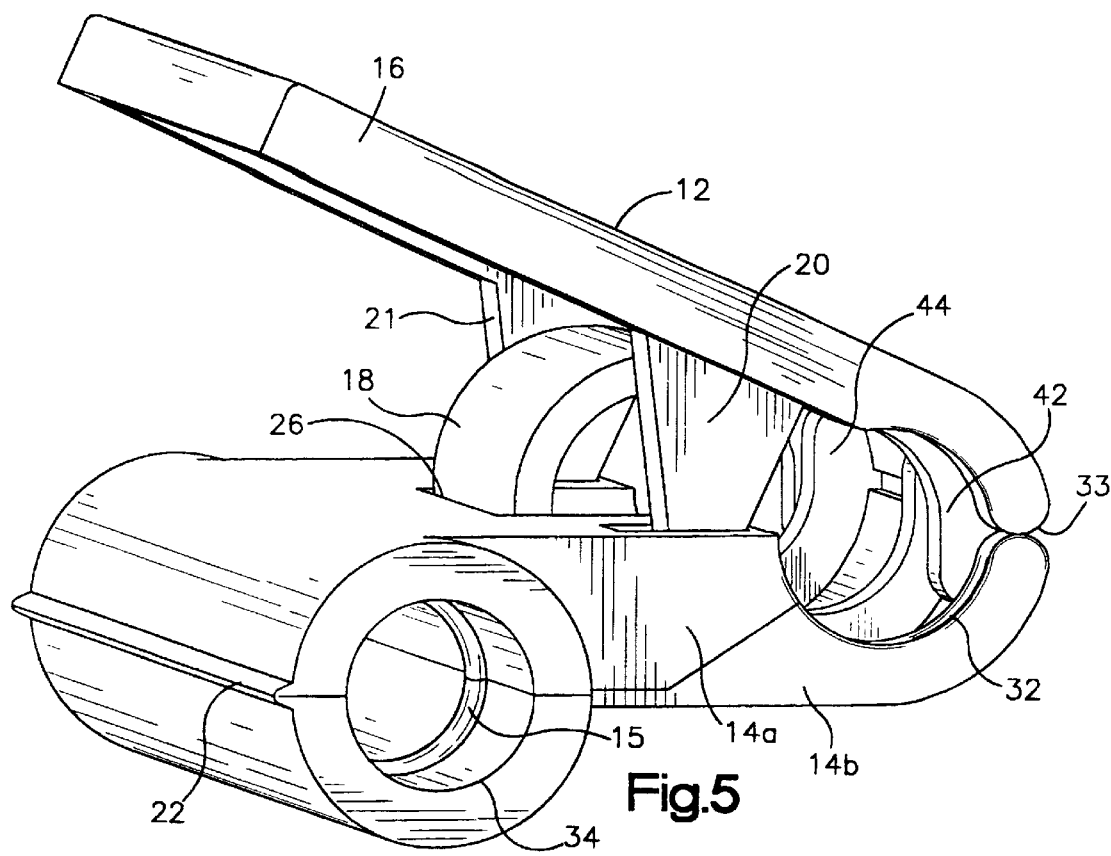
FIG. 5 is a rear perspective view of a second preferred embodiment of the present invention.
Figure 6:
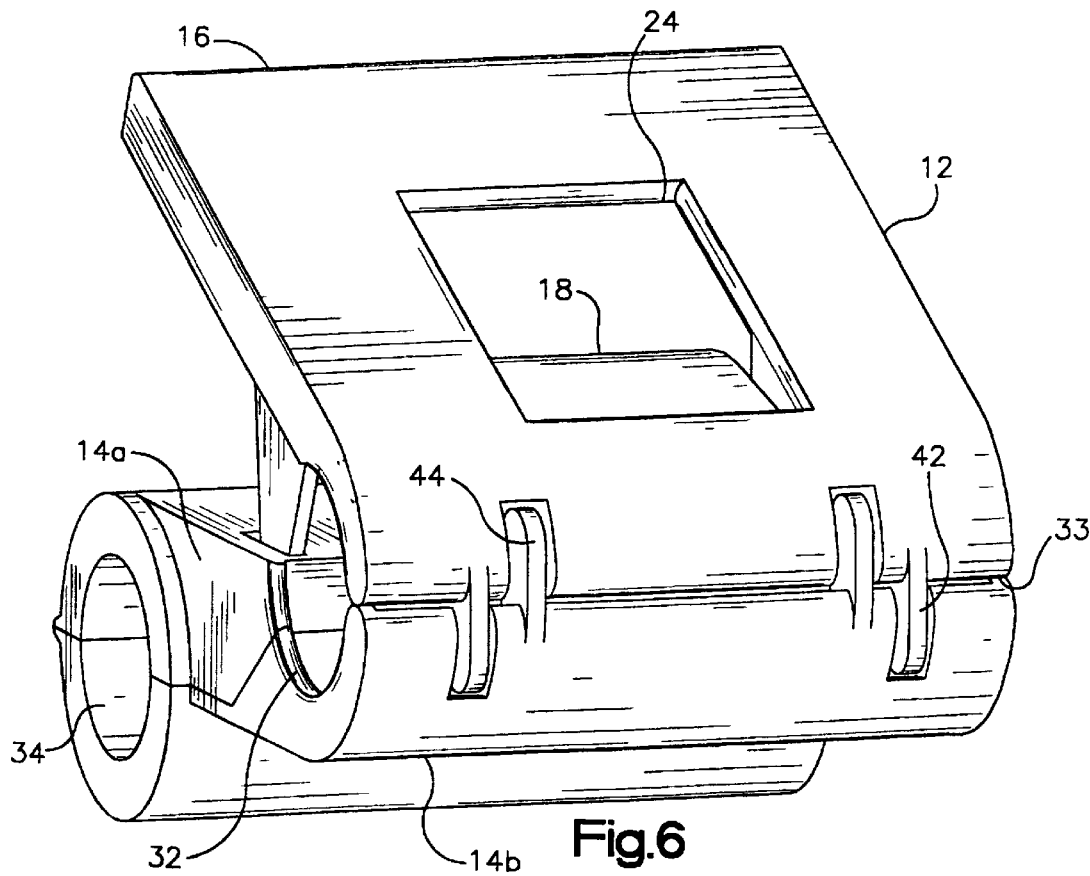
FIG. 6 is a frontal view of a second preferred embodiment of the present invention.

FIGS. 5 and 6 show an show a second preferred embodiment of the present invention. In this embodiment, teeth 42, 44 are integrally molded into the upper member 12 and lower member 14 on the curved portion of each member and thereby act as extensions of the open sleeve 32 near the opening 33. These teeth 42, 44 aid in retaining the power or extension cord within the open sleeve 32. As can be seen in FIG. 5, the teeth 42, 44 act as ribs within the open sleeve 32 and firmly grasp the insulation and covering of the electric power or extension cord to retain the cord within the open sleeve 32. Additionally, if a cord is constructed from larger gauge electrical wire, giving the cord a larger diameter such that it would not fit within the open sleeve 32, teeth 42, 44 allow for the extension of the open sleeve 32, such that the larger diameter power cord is retained within open sleeve 32.

In use, the power cord clip of the present invention is used to hold electric cords in close proximity to each other and prevent them from moving and therefore becoming tangled and susceptible to damage. The plug end of an extension or power cord is placed in the closed sleeve 34 when the two pieces 14a, 14b of lower member 14 are separated. The two pieces 14a, 14b are then attached via snap connectors so that the cord cannot come out of closed sleeve 34. Upper member 12 and lower member 14 are then coupled together by spring clip 18 by inserting spring clip 18 into upper member slot 24 and lower member slot 26. After the power cord clip 10 of the present invention is assembled, the user depresses the lever 16 which biases the opening 33 to the open position to allow for placement of the power cord within the open sleeve 32. Once the section of cord is inserted into the open sleeve 32 and the user releases the lever to retain the cord in the power cord clip.

Now referring to FIG. 7, a power cord clip in accordance with a third embodiment of the present invention is shown generally at 60, and is comprised of an upper member 62 and a lower member 64 which may be clasped together by screw(s) 66 or some other suitable fastening system. For example, as the clip 60 may be molded from a plastic material, the fastening system may be molded right into the members 62 and 64, such as using a retaining clip and slot that snap fits together or another suitable arrangement. Each member 62 and 64 may be constructed of a suitable plastic or other material, and it is preferred such material be of high strength and yet has resiliency to allow movement of portions thereof for securing power cords in the clip 60. Integrally attached to the upper member 62 is a flange or actuating lever 68. When the upper member 62 and lower member 64 are secured together by screw(s) 66, two cord holding sleeves are created. At the back of the cord clip 60 is a closed sleeve 70. At the front of the clip 60 is created an open sleeve 72. Within the closed sleeve 70 is a retaining member or projecting boss 74 that is used to help retain a power or extension cord in a fixed position with respect to the clip. The retaining member 74 may be integrally molded into a portion of the closed sleeve 70 of the clip 60. The retaining member 74 is constructed in a manner that member 74 bites into and frictionally engages the covering of the electric cord but does not cut or damage the covering or insulation of the cord in any way. The resiliency of the material from which clip 60 is constructed also facilitates this action. The retaining member 74 prevents the power or extension cord from rotating within or slipping through the closed sleeve 70. Optionally, more than one retaining member 74 could be molded into the closed sleeve 70 to further aid in retention of the cord in the closed sleeve 70.

At the other side of the cord clip 60 is an open sleeve 72 with an opening 76 on one side of the open sleeve. Integrally molded within the open sleeve 72 are retention members or ribs 78. The retention members 78 assist in retaining the temporarily held portion of a power cord in place while the cord is being held by the open sleeve 72 of the clip 60. Operating lever 68 may be integrally molded into the upper member 62 of the cord clip 60 and is depressed by the user to selectively open and close the opening 76. Depression of lever 68 increases the size of opening 76 to allow a power cord to be selectively inserted into sleeve 72 and secured in position as desired. Between lever 68 and top of the upper member 62, a pivot or biasing member 80 is placed to aid in the opening and closure of the opening 76 of the open sleeve 72. The biasing member 80 may be a spring or other suitable member positioned to exert force against the lever 68 to normally bias opening 76 to a substantially closed position.

Now referring to FIG. 8, another preferred embodiment of the present invention is shown generally at 90. This embodiment may again comprise an upper member 92 and a lower member 94 which are held together by screw(s) 96 or other fastening system. Securing the upper member 92 and lower member 94 together again forms a closed sleeve 98 and an open sleeve 100. Within the closed sleeve 98 may again be provided a retaining member 110 which aids in the retention of a power or extension cord as described above. Associated with the open sleeve 100 is an opening 104 that allows a power or extension cord to be inserted into the clip 90 and retained in position as described. The member 92 includes an integral lever 106 forming a "living" hinge which allows opening 104 to be widened for insertion of a cord and then returns to its original position wherein opening 104 is substantially closed. Retaining members 108 are integrally molded within the open sleeve 100 for better frictional engagement between the clip 90 and a power cord inserted therein. In this embodiment, the shape of the members 92 and 94 and the subsequent arrangement of closed sleeve 98 and the open sleeve 100 are offset to allow for better grasping of the lever 106 and therefore making it easier to insert a cord through the opening 104 into the open sleeve 100. The offset nature of the sleeves 98 and 100 further provide significant leverage advantages which simplify operation of the lever 106 while fully opening sleeve 100 for insertion of a cord. The lower member 94 may also have a configuration such that a depression or groove 112 is formed to facilitate grasping by the hand of a user. This configuration also moves the pivot point of lever 106 back toward the closed sleeve 98 to facilitate increasing the size of the opening 108 upon depression of lever 106.

Now referring to FIG. 9, a further alternative embodiment of the present invention is shown. A one piece power cord clip is shown generally at 120. In this embodiment the cord clip 120 is molded in a one piece configuration, in order that the cord clip 120 could not be removed from the cord after being placed onto the cord. To place the cord clip 120 around the cord, the clip 120 would be placed onto the cord before the open wire end is connected to an electric power tool such as a drill or a saw. This embodiment is comprised of a closed sleeve 122, and open sleeve 124 with an opening 126 somewhere along the circumference of the open sleeve 124, and a lever 128 which is integrally attached to the cord clip 120 adjacent to the open sleeve 124. Optionally, between the lever 128 and the top of the cord clip 120 is a pivot member (not shown). The pivot member can be a solid piece of material integrally molded with the clip 120 or a spring that is placed between the lever 128 and the top of the clip 120 and held in place there by the forces exerted by the spring on the lever and the top of the clip 120. Within the closed sleeve 122 is a retaining member 132 which is integrally attached to the open sleeve 124 and assists in the positioning and the retention of a power cord that has been placed into the closed sleeve 122. Integrally attached within the open sleeve are ribs 134 along the top and bottom of the circumference of the open sleeve 124. Ribs 134 increase the surface contact that the open sleeve 124 has with the cord and therefore aids in the retention of cord within the cord clip 120.

The present invention is molded by methods known in the art from plastics or polymers that give the cord clip of the present invention structural integrity while at the same time flexibility for the lever to act as a hinge and open the opening of the open sleeve to accept the power or extension cord. One such plastic is polypropylene.

Other embodiments and variations to the preferred embodiments described herein will be apparent to those skilled in the art and may be made without departing from the spirit and scope of the invention as defined in the above description.

What is claimed is:

1. A power cord clip comprising:

a body member having a biasing mechanism and including a closed sleeve and an open sleeve, said closed sleeve being adapted to have a cord positioned there through and said open sleeve having an opening along its circumference, wherein force is applied against said biasing mechanism to selectively widen said opening and allow a portion of said cord to be positioned and selectively secured in said open sleeve; and, a tubular insert having an opening along its length which is selectively positioned within said sleeves.

2. A power cord clip as recited in claim 1, wherein said body member is constructed from a first member and a second member selectively attached to said first member.

3. A power cord clip as recited in claim 1, wherein said tubular insert further comprises at least one retaining member for aiding positioning of a power cord within said insert.

4. A power cord clip as recited in claim 1, wherein said at least one retaining member is a retention member integrally formed within said insert.

5. A power cord clip as recited in claim 1, wherein said at least one retaining member is a plurality of retention teeth integrally formed within said insert.

6. A power cord clip as recited in claim 1, wherein said at least one retaining member is a plurality of ribs integrally formed within said insert.

7. A power cord clip comprising:

a first member;

a second member selectively coupled to said first member, said second member having a closed sleeve, said closed sleeve being adapted to be positioned on a cord so as to be attached thereto;

a spring clip that couples said first member to said second member;

said first member having an actuating lever associated therewith;

said first and second members defining an open sleeve when coupled together by said spring clip, said open sleeve having an opening along its circumference, wherein said lever is depressed to widen said opening and allow a portion of said cord to be positioned and selectively secured in said open sleeve.

8. A power cord clip as recited in claim 7, wherein said second member is constructed from two pieces which are attached by an integrally molded hinge located along the circumference of said closed sleeve to allow for insertion of a portion of said cord within said closed opening and said two pieces are attached by male and female snap clips formed integrally within said two pieces.

9. A power cord clip as recited in claim 7, further comprising at least one retaining member for aiding in the retention and positioning of the cord within said closed or open sleeve.

10. A power cord clip as recited in claim 9, wherein said at least one retaining member is a retention member integrally formed within said closed or open sleeve.

11. A power cord clip as recited in claim 9, wherein said at least one retaining member is a plurality of retention teeth integrally formed within said closed or open sleeve.

12. A power cord clip as recited in claim 9, wherein said at least one retaining member is a plurality of ribs integrally formed within said closed or open sleeve.

13. A power cord clip as recited in claim 7, further comprising a tubular insert having an opening along its length which is selectively positioned within said sleeves.

14. A power cord clip as recited in claim 13, wherein said tubular insert further comprises at least one retention member for aiding positioning of a power cord within said insert.

15. A power cord clip as recited in claim 14, wherein said at least one retention member is integrally formed within said insert.

16. A power cord clip as recited in claim 14, wherein said at least one retention member is a plurality of teeth integrally formed within said insert.

17. A power cord clip as recited in claim 14, wherein said at least one retention member is a plurality of ribs integrally formed within said insert.

* * * * *